United States Patent [19]
De Sa

[11] Patent Number: 5,285,254
[45] Date of Patent: Feb. 8, 1994

[54] RAPID-SCANNING MONOCHROMATOR WITH MOVING INTERMEDIATE SLIT

[76] Inventor: Richard J. De Sa, 1540 Ethridge Rd., Jefferson, Calif. 30549

[21] Appl. No.: 858,899

[22] Filed: Mar. 27, 1992

Related U.S. Application Data

[63] Continuation-in-part of Ser. No. 674,185, Mar. 25, 1991, abandoned.

[51] Int. Cl.⁵ .............................. G01J 3/06; G01J 3/32
[52] U.S. Cl. ..................................... 356/308; 356/333
[58] Field of Search ............... 356/308, 328, 333, 334

[56] References Cited

U.S. PATENT DOCUMENTS

| | | | |
|---|---|---|---|
| 2,670,652 | 3/1954 | Sherman | 356/334 X |
| 3,561,872 | 2/1971 | Grabowski et al. | 356/319 X |
| 3,700,331 | 10/1972 | White | 356/308 |
| 3,756,721 | 9/1973 | Williams | 356/326 |
| 4,575,243 | 3/1986 | Witte | 356/333 |
| 4,660,975 | 4/1987 | Aughton | 356/308 |
| 4,964,725 | 10/1990 | Goldovsky | 356/308 |

FOREIGN PATENT DOCUMENTS 832353  5/1981  U.S.S.R. .............................. 356/333

OTHER PUBLICATIONS

Murty "Compensation for Coma & Anamorphic Effect in Double Monochromators" Applied Optics, vol. 11, #7, Jul. 1972, pp. 1637–1638.
Farrand Grating monochromators, Farrand Optical Co. Inc., Focius, N.Y., Printed Sep. 1966.

*Primary Examiner*—Vincent P. McGraw

[57] ABSTRACT

The present invention is a scanning monochromator for producing a light beam which rapidly and repetitively varies in wavelength. The device is a subtractive double monochromator in which an intermediate slit is moved to effect wavelength scanning; the intermediate slit fitted in a rotating disk positioned at the intermediate focal plane of the monochromator. Two forms of the device are disclosed.

12 Claims, 3 Drawing Sheets

RAPID-SCANNING MONOCHROMATOR WITH MOVING INTERMEDIATE SLIT

RELATED U.S. APPLICATION DATA

The present invention relates in general to monochromators and spectrographs and, in particular, to a novel scanning monochromator capable of a wide range of scanning speeds, including very rapid scanning. This document is a continuation-in-part on U.S. patent application Ser. No. 07/674,185 entitled "METHOD AND APPARATUS FORMING A NOVEL RAPID-SCANNING MONOCHROMATOR," filed Mar. 25, 1991, now abandoned.

BACKGROUND OF THE INVENTION

A grating monochromator is an optical device which disperses the light from a radiant source into its constituent wavelengths and focuses one wavelength at the exit slit of the device, there to be observed or utilized.

Monochromators usually comprise a housing with an entrance slit to receive light into the housing, a grating positioned within the housing to receive and disperse the light passing through the entrance slit, and an exit slit in the housing positioned to transmit a narrow bandwidth of the light dispersed by the grating. The grating can pivot within the housing to direct different wavelengths of the spectrum through the exit slit for use or observation.

A grating spectrograph is an optical device related closely to a monochromator. Like a monochromator, a spectrograph disperses a beam of light into its constituent wavelengths. However, a monochromator focuses only a narrow band of wavelengths at the exit aperture or slit, while the design of the spectrograph is such that the entire spectrum of wavelengths present in the source is focused at the exit focal plane. Thus, a spectrograph is a polychromator, as multiple wavelengths are present simultaneously in linear array at the exit focal plane. The position along the spectrum determines which wavelength is present.

Many monochromators and spectrographs function with a single grating. A double grating system, however, offers improved spectral resolution and greatly reduced stray light ("stray light" being light of a wavelength other than that intended).

The well-known equation (ref 1) describing the behavior of a plane, reflective, diffraction grating is shown below. If i is the angle of incidence, d the angle of diffraction, s the distance between the rulings, n the order of the spectrum, then the wavelength (lambda) is $$\text{LAMBDA} = s/n(\sin i + \sin d) \quad (1)$$

If only first order diffraction is considered, n=1, s=constant for any particular grating, therefore, $$\text{LAMBDA} = \text{constant} (\sin i + \sin d) \quad (2)$$

Examination of equation 2 reveals that there are three ways that the wavelength, lambda, can be changed or scanned.

Case I: d is fixed and i is varied. This is the case of a device with a fixed grating, fixed exit slit, and moving entrance slit.

Case II: i is fixed and d is varied. This is the case of a device with a fixed grating, fixed entrance slit, and moving exit slit.

Case III: Both i and d are varied. This is the case of a device with a rotatable grating and fixed entrance and exit slits.

The present invention corresponds to Case I. That is, the single grating version uses a moving entrance slit so that the angle of incidence i varies as the slit moves. The double grating version can be viewed in the same way, since the moving intermediate slit is the entrance slit to the second half of the double system.

In the single grating version of the present invention, the entrance slit moves laterally along the length of a linear light source, so that the light admitted to the device strikes the diffraction grating at varying angles of incidence. Since the exit slit of the monochromator is fixed in position, only one wavelength of light will emerge from it since only one wavelength of light satisfies the grating equation for each different angle of incidence and fixed angle of diffraction.

The double grating version of the present invention is a form of subtractive double monochromator. These devices have been described and analyzed in the literature (see references 1, 2, 3, 4, and 5).

Double monochromators are devices which use two monochromators where the exit slit of the first monochromator is the entrance slit of the second monochromator. Thus, a double monochromator has an entrance slit, an intermediate slit, and an exit slit and the first dispersing element (diffraction grating) forms a real spectral image in the plane of the intermediate slit. If the dispersing elements of the monochromators are arranged so that the dispersion of the second element adds to the dispersion of the first element, the device is termed an "additive double monochromator." These devices exhibit low stray light and high dispersion and are very widely used. If the dispersing elements are arranged so that the dispersion of the second element subtracts from the dispersion of the first, the device is termed a "subtractive double monochromator." Subtractive double monochromators also provide very low stray light since the second half of the device reduces the already low stray light passing from the first half; this property is particularly important in spectrophotometric applications requiring high photometric accuracy.

The double grating version of the present invention can be described as a subtractive double grating monochromator in which the intermediate slit is rapidly and repeatedly moved (in a way to be described) across the real spectral image formed in the plane of the intermediate slit, thereby causing a rapid sweeping or scanning of the wavelength of the light admitted to the second half of the device wherein the light is de-dispersed or combined to a single beam irrespective of wavelength which beam emerges from the exit aperture of the monochromator.

PRIOR ART

The prior art spectrometer system described in U.S. Pat. No. 3,756,721 and U.S. Pat. No. Re 29,939 resembles slightly the present invention, but the similarities are superficial and this former system cannot achieve the results obtained with the present scanning monochromator. Several important distinctions exist between the present invention and this former spectrometer system.

This former system is a spectrometer in which a wobbling (oscillating) slit is placed in the radiant energy path between the radiant energy source and the spectrometer so that the spectrometer can compare the "intensity of light at a particular wavelength with the intensity of light of wavelengths immediately adjacent to that wavelength in the same spectrum." The system was not intended to scan over large wavelength regions, whereas the present invention has as its primary function the capability of rapidly scanning large wavelength spans and is not limited to use in a particular spectrometer but can function in general as a monochromator.

The former system uses a wobbling entrance slit which is displaced approximately 1 mm in a sinusoidal fashion at a rate of 45 cycles per second. The present invention uses a rotating disk fitted with multiple slits; each slit moves unidirectionally over the 25 millimeter length of the entrance port of the single grating version or over the 25 mm length of the real spectral image formed at the plane of the intermediate slit in the double grating version of the present invention.

A second prior art device described in U.S. Pat. No. 4,575,243 somewhat resembles the present invention, but the prior art device operates in a different way and cannot achieve the performance or the broad range of applicability of the present invention.

The former system is a scanning monochromator which uses a double grating optical arrangement in the form of a subtractive double monochromator. In the prior art device, the gratings are casing-fixed and scanning of wavelength occurs when a spiral slot is moved transversely in the plane of the intermediate spectral image. The spiral slot is formed in a rotatable disk whose axis of rotation is in the same plane as the optical axis of the device and spaced laterally from the intermediate spectral image. This design means that the spiral slot moves transversely across the intermediate spectral image only once per revolution of the scanning disk. Also, since the gratings are casing-fixed, the device is usable over a restricted wavelength region which is determined at the time of manufacture.

In the present invention, the rotatable disk is fitted with multiple slits arranged concentrically about the circumference of the scanning disk. The axis of rotation of the scanning disk is in a plane normal to the optical axis and spaced above (or below) the intermediate spectral image. This design means that the multiplicity of slits move laterally in rapid succession across the intermediate spectral image. Advantages of the present invention over the prior art monochromator include:

the option of fitting multiple slits in the scanning disk to produce multiple scans of the spectral image per revolution of the disk. In the preferred embodiment of the present invention, 16 slits are used so that 16 scans occur for each revolution of the disk.

the option of fitting multiple slits, each with a particular width, to produce scans with different resolutions within a given sequence of scans.

the option of fitting a single slit in the scanning disk to result in one scan per revolution and no light for most of the rotation of the scanning disk. The present invention can illuminate the sample as little as 1/20 of the time required for each revolution of the scanning disk, yet scan the spectral image very rapidly (a very desirable capability when working with photolabile samples).

In the present invention, the gratings are not casing-fixed, but can be rotated in the way common in monochromators. Thus the device is usable over a broad wavelength range and is not restricted to a range selected at the time of manufacture.

Other prior art devices which use a scanning disk have been described (e.g., U.S. Pat. Nos. 4,964,725 and 3,700,331). These devices are designed to detect the spectral components of a light beam and cannot be used to produce a stationary beam of light which changes in wavelength. The present invention is specifically designed to produce a light beam with varying spectral content and is not related to, nor in any way derived from, these other devices.

Lastly, a prior art device for "controlling the spectral components of a light beam" is described in U.S. Pat. No. 4,660,975. This device controls the spectral components of a light beam by transverse movement of an aperture placed at the intermediate slit position of a subtractive double monochromator employing prisms as the dispersion means. This prior art device does not utilize a rotating disk with multiple slits as does the present invention and thus cannot be used as a rapid-scanning device. The purpose of the prior art is to provide a broad wavelength range beam of light, the color of which beam can be changed by moving the aperture with a galvonometer linked to the aperture. This differs from the present invention in (a) the dispersion means, (b) the construction of the intermediate aperture, and (c) the method of moving the aperture.

SUMMARY OF THE INVENTION

Disclosure is made of a scanning monochromator which produces an output beam of radiation which can be scanned in wavelength very rapidly and with very high repetition rates. The method of scanning is to move the intermediate slit of a subtractive double monochromator by mounting one or more slits in a rotatable disk which is positioned in the plane of the intermediate spectral image of the double monochromator with its rotation axis placed below (or above) the optical plane of the double monochromator so that, on rotation of the disk, a repetitive lateral movement of one slit or successive slits across the spectral image is achieved, resulting in scanning of the output wavelength of the device.

Two forms of the scanning monochromator are disclosed. One uses a conventional subtractive double monochromator, the other a form of subtractive double monochromator in which a plane mirror disposed between the two halves of the instrument serves to reverse the order of the wavelengths in the intermediate spectral image.

BRIEF DESCRIPTION OF THE DRAWINGS

Representations which embody the principles of the present invention are described hereinafter in greater detail with reference to the accompanying drawings, which are not drawn to scale and wherein.

DETAILED DESCRIPTION OF THE INVENTION

Figure 1:
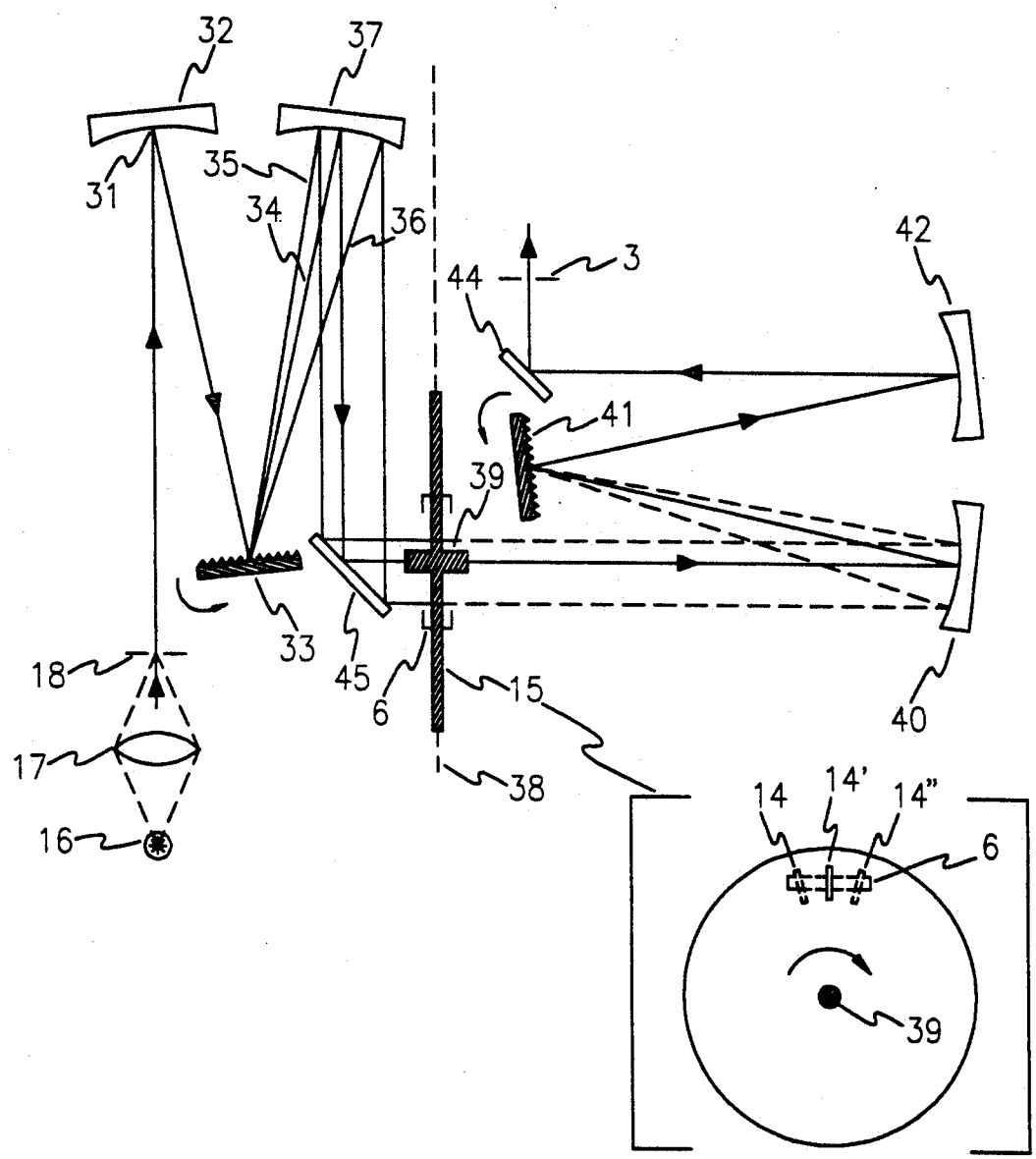
FIG. 1: Schematically illustrates the optical path of light rays in the single grating version of the present invention, which path is illustrated by the ray axes; the figure also illustrates a rotatable disk with a slit which is utilized in the monochromator.

FIG. 1: One preferred embodiment of the single grating version of the present invention is shown in FIG. 1. It should be understood that all optical components are centered in the optical plane of the device which is coincident with the plane of the paper of FIG. 1.

Radiation from a rectangular or linear light source 10 in FIG. 1 is directed into the entrance aperture 6 of the device at the level of plane 38 which plane is normal to the plane of the paper of FIG. 1. A rotatable scanning disk 15 is positioned in plane 38 with its axis of rotation 39 also in plane 38, but positioned below (or above) the optical plane of the device. The axis of rotation 39 of scanning disk 15 is placed from source 10 so that the rectangular or linear beam from source 10 falls on the scanning disk 15 at a position radially spaced from its rotation axis 39 and coincident with aperture 6. The scanning disk 15 is fitted with one or more radial slits 14 which are transparent to the radiation and are arranged in a circular row concentric with the central rotation axis 39 of the disk 15. The scanning disk 15 may contain any number of slits 14 providing that the slits are so spaced that the light source is never scanned by more than one slit at a time.

The slits in the scanning disk 15 admit light into the entrance aperture 6 of the device; as the scanning disk 15 rotates, the slit is moved laterally and hence the position of the incoming light beam is altered; concave focusing means 40 reflects the incoming light to diffraction grating 41. The angle of incidence of the input beam upon the grating 41 changes as the entrance slit 14 sweeps along the aperture 6 as scanning disk 15 rotates. Light diffracted by grating 41 is gathered and focused by concave mirror 42, turned 90° by folding mirror 44, and imaged at slit 3. Since the position of the exit slit 3 is fixed, only that wavelength of light diffracted at the appropriate angle from grating 41 will be focused at exit slit 3. The wavelength of the exit beam changes as the entrance slit is moved.

In summary, the embodiment of FIG. 1 is a monochromator in which the entrance slit moves so as to change the angle of incidence of the input light upon the grating. As slit 14 moves, the angle of incident changes and the wavelength passed by the device also changes. Since a slit can be moved rapidly, the device can perform as a rapid-scanning monochromator.

Figure 2:
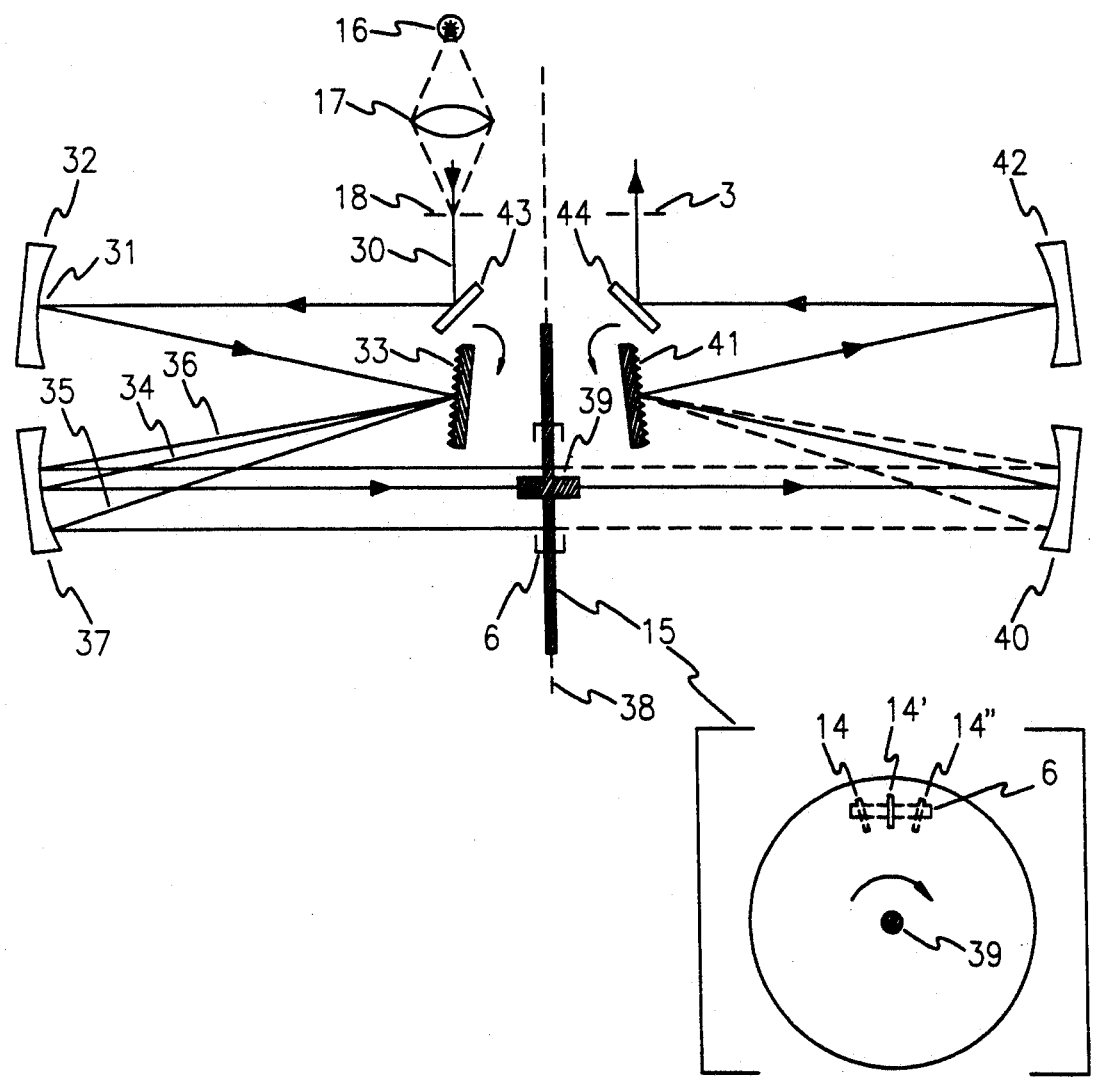
FIG. 2: Schematically illustrates the optical path of light rays in the subtractive double grating monochromator version of the present invention; the figure also illustrates a rotatable disk with a slit which is utilized as the intermediate slit in the monochromator.
Figure 3:
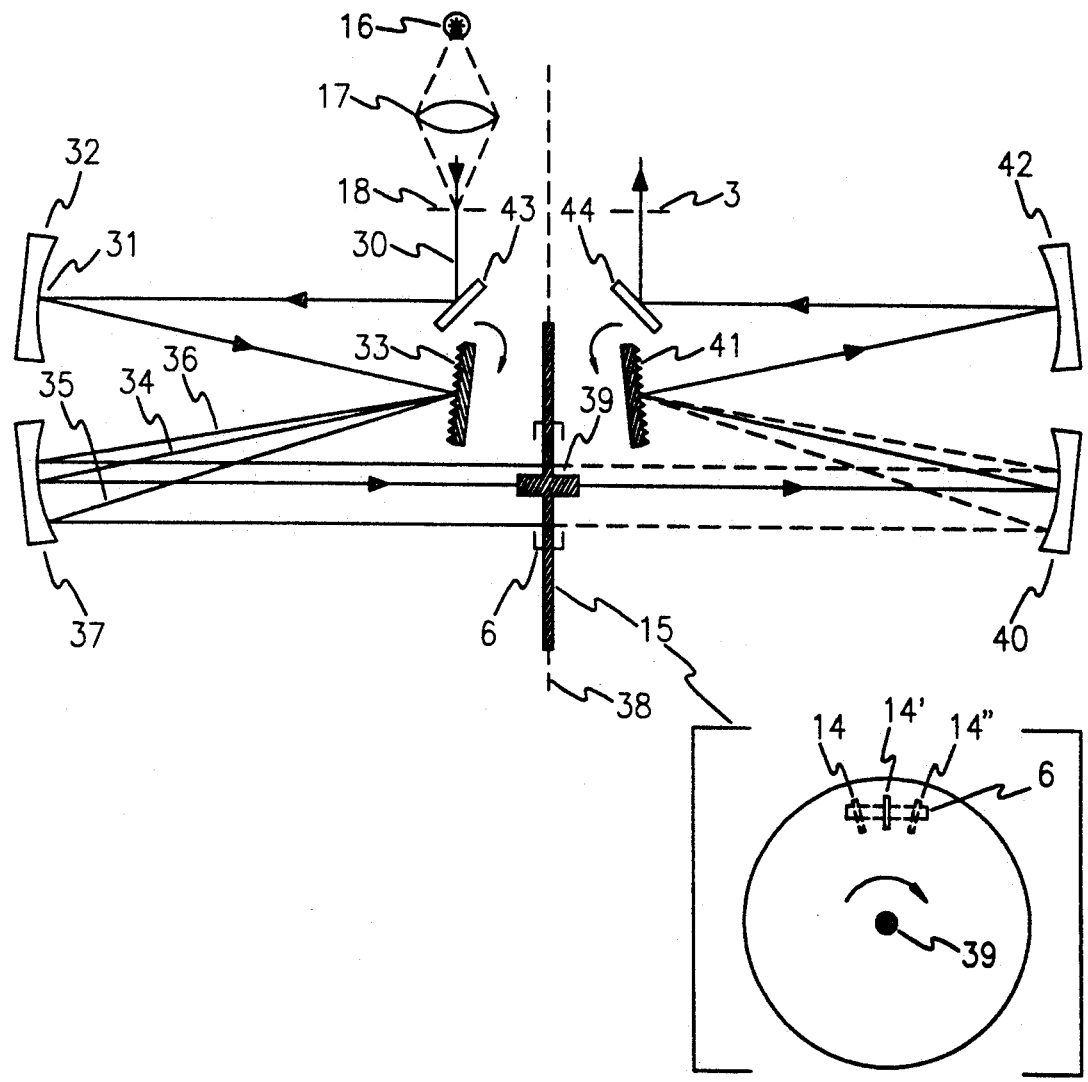
FIG. 3: Schematically illustrates the optical path of light rays in the preferred embodiment of the subtractive double monochromator version of the present invention; the figure also illustrates a rotatable disk fitted with a slit which is utilized as the intermediate slit in the monochromator.

FIG. 2: Preferred embodiments of the double grating version of the present invention are shown in FIG. 2 and FIG. 3. It should be understood that all optical components of the devices shown in FIG. 2 and FIG. 3 are centered in the optical plane which is coincident with the plane of the paper in FIGS. 2 and 3.

Radiant energy from a light source 16 in FIG. 2 is imaged by means of a convex lens 17 (or other optical focusing means) in the plane of an entrance slit 18. The axial ray 30 of the light beam is turned 90° by mirror 43 and then impinges at a point 31 centered on a focusing element 32. Focusing element 32 reflects and collimates the light and directs it to a first dispersing element 33, shown in this embodiment as a plane grating. Dispersive element 33 disperses (fans) the beam as a function of its wavelength content, generating a fan of rays 34, the marginal rays of which are designated 35 and 36. Focusing means 37, a second concave mirror, reflects and focuses the fan of rays 34 and creates a spectrally dispersed real image of the entrance slit 18 in a plane 38 along aperture 6.

A rotatable scanning disk 15 is positioned in said plane 38 with its axis of rotation 39 in a plane perpendicular (normal) to said optical plane. The axis of rotation 39 of the scanning disk 15 is placed at a distance from the spectral image so that the spectral image is formed on the disk at a position radially spaced from its rotation axis 39 and coincident with the circular centerline of the slits. The scanning disk 15 is fitted with one or more radial slits 14 which are transparent to the radiation of the spectral image and are arranged in a circular row concentric with the central rotation axis 39 of the disk 15. The scanning disk 15 may contain any number of slits providing that the slits are so spaced that the spectral image is never scanned by more than one slit at a time. The width of a slit determines the bandwidth of the radiation passed by that slit; the effective overall bandwidth of a subtractive double monochromator is largely determined by the width of its intermediate slit.

In the present invention, the multiplicity of slits in a given scanning disk may have the same or different widths so that spectra with a multiplicity of bandwidths can be produced in a sequence of spectra. Typical slits in the preferred embodiment are 0.1 to 1 mm wide.

The entrance slit 18, folding mirror 43, first focusing mirror 32, diffraction grating 33, and second focusing mirror 37 are arranged relative to the scanning disk 15 so that the spectral image is formed in the plane with an in-tangential relation to the circular center line of the slits 14. Accordingly, during rotation of the scanning disk 15, the slits 14 undergo lateral scanning movement in succession along the spectral image from one end to the other. The radial length of each slit is such that each slit is fully illuminated by the spectral image during the entire scanning movement of the slit from one end of the image to the other.

Radiation passing through the slits 14 of the rotating scanning disk 15 is focused by concave mirror 40 and strikes second diffraction grating 41 at an angle of incidence dependent on the slit position at any given instant; diffracted light is focused by mirror 42 to folding mirror 44 and thence to fixed exit slit 3.

In one embodiment of the present invention, FIG. 2, the focal length of mirrors 32, 37, 40, 42 is 250 mm and the gratings 33, 41 are 50 mm by 50 mm. The span of wavelengths included in the spectral image at the intermediate slit of the present invention is determined by the character of the grating. For example, a plane grating with 400 grooves/mm produces a spectral image that spans 10 nanometers per mm; the length of the spectral image is approximately 22 mm. Therefore, the total span is 220 nanometers. Other gratings will provide different spans and resolutions according to the well-known behavior of diffraction gratings. The diffraction gratings 33, 41 can be rotated about their centers in the manner common in monochromators so as to allow selection of the wavelengths of radiation at the limits of the spectral image at the intermediate slit of the device. The present invention can be used throughout the UV, visible, near IR, and infra-red regions of the electromagnetic spectrum.

Those skilled in the art will recognize that the embodiment of the present invention shown in FIG. 2 is a form of subtractive double monochromator in which the intermediate slit can be moved rapidly. The optical arrangement shown in FIG. 2 is equivalent to the subtractive double monochromator described by Murty (ref 5) in his FIG. 1(B).

FIG. 3: The preferred embodiment of the present invention shown in FIG. 3 is a subtractive double monochromator with a plane mirror between the two halves of the double monochromator; this optical arrangement has two practical advantages over the arrangement shown in FIG. 2. In the FIG. 3 embodiment, the two gratings (elements 33 and 41) rotate in the same direction when the wavelength range is altered and the entrance and exit slits (3, 18) are on opposite sides of the device, both conditions leading to specific mechanical and operational advantages.

The operation of the devices shown in FIGS. 1, 2, and 3 is obvious from the foregoing description. Although these specific embodiments have been described in detail herein, such embodiments are for exemplary purposes and are not limiting since other arrangements and configurations can be made. For example, concave gratings could be used in place of plane gratings and other beam turning mirror arrangements can be utilized without departing from the spirit of the present invention. The essence of the single grating version of the present invention is the rapid, repetitive, and unidirectional movement of the entrance slit to effect wavelength scanning; the essence of the double grating version of the present invention is the rapid, repetitive, and unidirectional movement of the intermediate slit in the plane of the real spectral image of a subtractive double monochromator to effect wavelength scanning. The present invention is limited only by the appended claims and the reasonable interpretation thereof.

The three forms of rapid-scanning monochromator shown in FIGS. 1, 2, and 3 all utilize a rotating disk fitted with one or more slits to effect scanning of wavelength. In the figures, the disk is shown with only one slit for clarity; in the preferred embodiment, the disk is fitted with multiple slits so that the spectrum is scanned multiple times for each rotation of the disk. The disk is 470 mm in circumference; 16 slits are arranged around the circumference of this disk. When the disk is rotated at 62.5 Hz (3750 rpm), 16 * 62.5=1,000 scans occur each second. Since rotational speeds of 125 Hz (7500 rpm) and higher are easily achieved with small motors, scanning speeds of 2,000 or more scans per second are readily accessible.

REFERENCES CITED IN PATENT APPLICATION SERIAL #07/674 185

1. Handbook of Chemistry and Physics, 1975, p. F-95
2. Christensen, R. A., and Potter, R. J., Applied Optics, 2, 1049 (1963)
3. Witte, W., Optick, 22, 464 (1965)
4. Allemand, C. D., Applied Optics, 9, 1304 (1970)
5. Murdy, M. V. R. K., Applied Optics, 11, 1637 (1972)

I claim:

1. A rapid-scanning subtractive double grating monochromator for producing a light beam which rapidly and repetitively varies in wavelength comprising, in combination:

a fixed entrance slit;

an entering light beam disposed to pass through said entrance slit and for defining an optical axis;

a first plane mirror means to turn said light beam 90°;

a first concave mirror means for collimating said light beam, after passing through said entrance slit and being turned 90° by said plane mirror, and reflecting said collimated light beam to a first diffraction grating means for dispersing said collimated beam into dispersed beams having axes in accordance with wavelength about a fanning point on said optical axis;

a second concave mirror means disposed to receive and focus said dispersed beams to form intermediate images of said entrance slit in a plane, said intermediate images forming a spectrum;

an intermediate slit comprising an opaque scanning disk having one radiation transparent slit which is spaced from the rotation axis of said disk with said rotation axis disposed in a plane parallel to the plane of said optical axis so that said spectral image is focused in the plane of said slit and is coincident with the circular centerline of said slit in a manner whereby said slit undergoes lateral scanning movement across said spectral image during rotation of said disk;

a means for driving said disk in rotation;

a concave mirror means to receive said radiation passed by said slit and to direct said radiation to a second diffraction grating means oriented with respect to said first diffraction grating means whereby radiation is de-dispersed or recombined to a single beam irrespective of the wavelength of said radiation;

a concave mirror means to receive said recombined (de-dispersed) beam and focus said recombined beam in an image plane;

a second plane mirror means to turn said recombined beam 90°;

a fixed exit slit disposed on said optical axis in said image plane whereby radiation of a particular wavelength exits from the monochromator, said wavelength being determined by the position of said moving intermediate slit.

2. The rapid-scanning subtractive double grating monochromator according to claim 1 wherein said first and second diffraction grating means are coupled together, so as to rotate in unison in opposite directions when the monochromator is set to a particular wavelength region.

3. The rapid-scanning subtractive double grating monochromator according to claim 1 wherein said rotatable disk is fitted with multiple radiation transparent slits which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans.

4. The rapid-scanning subtractive double grating monochromator according to claim 1 wherein said rotatable disk is fitted with multiple radiation transparent slits each with a particular width which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans, each scan having a particular bandwidth.

5. The rapid-scanning subtractive double grating monochromator according to claim 2 wherein said rotatable disk is fitted with multiple radiation transparent slits which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans.

6. The rapid-scanning subtractive double grating monochromator according to claim 2 wherein said rotatable disk is fitted with multiple radiation transparent slits each with a particular width which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans, each scan having a particular bandwidth.

7. A rapid-scanning subtractive double grating monochromator for producing a light beam which rapidly and repetitively varies in wavelength comprising, in combination:
a fixed entrance slit;
an entering light beam disposed to pass through said entrance slit and for defining an optical axis;
a first concave mirror for collimating said light beam, after passing through said entrance slit, and reflecting said collimated light beam to a first diffraction grating means for dispersing said collimated beam into dispersed beams having axes in accordance with wavelength about a fanning point on said optical axis;
a second concave mirror means disposed to receive and focus said dispersed beams to form intermediate images of said entrance slit, said intermediate images forming a spectrum;
a plane mirror means, positioned within the focal length of said second concave mirror, for turning said light beam through 90° and for reversing the order of the wavelengths in said spectrum so as to orient said spectrum to enter the second half of said subtractive double monochromator;
an intermediate slit comprising an opaque scanning disk having one radiation transparent slit which is spaced from the rotation axis of said disk with said rotation axis disposed in a plane parallel to the plane of said optical axis so that said spectral image is focused in the plane of said slit and is coincident with the circular centerline of said slit in a manner whereby said slit undergoes lateral scanning movement across said spectral image during rotation of said disk;
a means for driving said disk in rotation;
a concave mirror means to receive radiation after passage through said intermediate slit and direct said radiation to a second diffraction grating means oriented with respect to said first diffraction grating means whereby radiation is de-dispersed or recombined to a single beam irrespective of wavelength;
a concave mirror means to receive said recombined (de-dispersed) beam and focus said recombined beam in an image plane;
a plane mirror means to turn said recombined beam 90°;
a fixed exit slit disposed on said optical axis in said image plane whereby radiation of a particular wavelength exits from the monochromator, said wavelength being determined by the position of said moving intermediate slit.

8. The rapid-scanning subtractive double grating monochromator of claim 7 wherein said first and second diffraction grating means are coupled together, so as to rotate in unison in the same direction when the monochromator is set to a particular wavelength region.

9. The rapid-scanning subtractive double grating monochromator according to claim 7 wherein said rotatable disk is fitted with multiple radiation transparent slits which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans.

10. The rapid-scanning subtractive double grating monochromator according to claim 7 wherein said rotatable disk is fitted with multiple radiation transparent slits each with a particular width which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans, each scan having a particular bandwidth.

11. The rapid-scanning subtractive double grating monochromator according to claim 8 wherein said rotatable disk is fitted with multiple radiation transparent slits which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans.

12. The rapid-scanning subtractive double grating monochromator according to claim 8 wherein said rotatable disk is fitted with multiple radiation transparent slits each with a particular width which are circumferentially and equivalently spaced from the rotation axis of said disk whereby said multiple slits undergo lateral scanning movement in succession across said spectrum during rotation of said disk thereby producing a very high rate of wavelength scanning and a high repetition rate of the scans, each scan having a particular bandwidth.

* * * * *